United States Patent
Mahvash et al.

(10) Patent No.: US 11,431,777 B2
(45) Date of Patent: *Aug. 30, 2022

(54) ADAPTIVE BITRATE STREAMING TECHNIQUES

(71) Applicant: AT&T Intellectual Property I, L.P., Atlanta, GA (US)

(72) Inventors: Mohammad Mahvash, Marina Del Rey, CA (US); Sassan Pejhan, Princeton, NJ (US); Buu Kha, Rosemead, CA (US); Garrett Newell, Lawndale, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/940,364

(22) Filed: Jul. 27, 2020

(65) Prior Publication Data

US 2020/0358839 A1    Nov. 12, 2020

Related U.S. Application Data

(63) Continuation of application No. 16/043,608, filed on Jul. 24, 2018, now Pat. No. 10,728,305.

(51) Int. Cl.
| | |
|---|---|
| *G06F 13/00* | (2006.01) |
| *H04L 65/65* | (2022.01) |
| *H04N 21/44* | (2011.01) |
| *H04L 65/60* | (2022.01) |
| *H04L 65/80* | (2022.01) |
| *H04L 65/612* | (2022.01) |
| *H04N 21/442* | (2011.01) |

(52) U.S. Cl.
CPC ........ *H04L 65/608* (2013.01); *H04L 65/4084* (2013.01); *H04L 65/607* (2013.01); *H04L 65/80* (2013.01); *H04N 21/44004* (2013.01); *H04N 21/44227* (2013.01)

(58) Field of Classification Search
CPC ..... H04L 65/608; H04L 65/607; H04L 65/80; H04L 65/4084; H04L 67/02; H04N 21/44004; H04N 21/44227; H04N 21/23439; H04N 21/26258; H04N 21/2225; H04N 21/4383
USPC ........ 709/236, 232–235, 231, 230, 203, 224
See application file for complete search history.

(56) References Cited

U.S. PATENT DOCUMENTS

| | | | |
|---|---|---|---|
| 9,038,116 B1 * | 5/2015 | Knox | H04L 12/2805 725/89 |
| 9,083,640 B2 | 7/2015 | Gutarin et al. | |

(Continued)

*Primary Examiner* — Kenneth R Coulter

(57) ABSTRACT

Devices, computer-readable media, and methods for providing a timeout for an adaptive bitrate streaming video chunk download are disclosed. For example, a processing system including at least one processor may determine a first bitrate for a first segment of a video program based upon an occupancy level of a video buffer of a device, request a first video chunk of the first segment encoded at the first bitrate, determine that the first video chunk is not received within a threshold of a duration of time after the requesting of the first video chunk, and request, responsive to the determining that the first video chunk is not received within the threshold of the duration of time, a second video chunk of the first segment encoded at a second bitrate that is lower than the first bitrate.

20 Claims, 9 Drawing Sheets

(56) References Cited

U.S. PATENT DOCUMENTS

| | | |
|---|---|---|
| 9,167,007 B2 | 10/2015 | Sriram et al. |
| 9,167,311 B2 | 10/2015 | Busse |
| 9,288,278 B2 | 3/2016 | Panje et al. |
| 9,294,531 B2 | 3/2016 | Zhang et al. |
| 9,462,021 B2 | 10/2016 | Ramamurthy et al. |
| 9,843,825 B1 | 12/2017 | Li et al. |
| 9,854,021 B2 | 12/2017 | Ramamurthy |
| 9,992,499 B2 | 6/2018 | Su et al. |
| 10,044,466 B2 | 8/2018 | Schmidt et al. |
| 10,306,284 B2 | 5/2019 | Lindgren et al. |
| 10,353,962 B2 * | 7/2019 | Choen .................. H04L 65/105 |
| 10,440,085 B2 * | 10/2019 | Chen ....................... H04L 67/10 |
| 10,601,946 B2 * | 3/2020 | Arsenault ........... H04L 65/4084 |
| 11,025,740 B2 * | 6/2021 | Arsenault ............. H04L 65/608 |
| 2009/0307368 A1 | 12/2009 | Sriram et al. |
| 2014/0075045 A1 | 3/2014 | Gutarin et al. |
| 2014/0241415 A1 | 8/2014 | Su et al. |
| 2015/0341411 A1 | 11/2015 | Huber et al. |
| 2016/0050246 A1 | 2/2016 | Liao et al. |
| 2016/0080455 A1 | 3/2016 | Itoh et al. |
| 2016/0094468 A1 | 3/2016 | May, Jr. et al. |
| 2016/0205164 A1 | 7/2016 | Schmidt et al. |
| 2016/0323201 A1 * | 11/2016 | Choen ................. H04L 47/2483 |
| 2017/0006312 A1 | 1/2017 | Yang et al. |
| 2017/0078348 A1 | 3/2017 | McGinnity et al. |
| 2017/0142417 A1 | 5/2017 | Deen et al. |
| 2017/0223361 A1 | 8/2017 | Blomqvist |
| 2018/0020246 A1 | 1/2018 | Harrison et al. |
| 2018/0241836 A1 * | 8/2018 | Arsenault ............. H04L 65/602 |
| 2018/0270521 A1 | 9/2018 | Lindgren et al. |
| 2018/0375792 A1 | 12/2018 | Bowen |
| 2020/0220944 A1 * | 7/2020 | Arsenault ........... H04L 67/2847 |
| 2021/0289040 A1 * | 9/2021 | Arsenault ............. H04L 65/608 |

* cited by examiner

ADAPTIVE BITRATE STREAMING TECHNIQUES

This application is a continuation of U.S. patent application Ser. No. 16/043,608, filed on Jul. 24, 2018, now U.S. Pat. No. 10,728,305, which is herein incorporated by reference in its entirety.

The present disclosure relates generally to adaptive bitrate streaming video programs, and more particularly to devices, non-transitory computer-readable media, and methods for providing a timeout for an adaptive bitrate streaming video chunk download, increasing a buffer occupancy threshold of an adaptive bitrate streaming mapping function, and for filling an adaptive bitrate streaming video buffer for live or recorded video streaming.

BACKGROUND

Video delivery technology has shifted from connection-oriented video transport protocols such as Real Time Messaging Protocol (RTMP) and Real Time Streaming Protocol (RTSP) to connectionless, e.g., Hypertext Transfer Protocol (HTTP)-based, adaptive streaming protocols, such as Moving Picture Experts Group (MPEG) Dynamic Adaptive Streaming over HTTP (DASH). A common feature of HTTP-based adaptive streaming protocols is the storage and delivery of a video program in multiple files (chunks) associated with segments of the video program and having different encoding bitrates, with the files linked together by a manifest file, or "index file" that defines all of the segments, and the available video chunks for the segments of the video program.

SUMMARY

In one example, the present disclosure describes a device, computer-readable medium and method for providing a timeout for an adaptive bitrate streaming video chunk download. For instance, in one example, a processing system including at least one processor may determine a first bitrate for a first segment of a video program based upon an occupancy level of a video buffer of a device, request a first video chunk of the first segment encoded at the first bitrate, determine that the first video chunk is not received within a threshold of a duration of time after the requesting of the first video chunk, and request, responsive to the determining that the first video chunk is not received within the threshold of the duration of time, a second video chunk of the first segment encoded at a second bitrate that is lower than the first bitrate.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
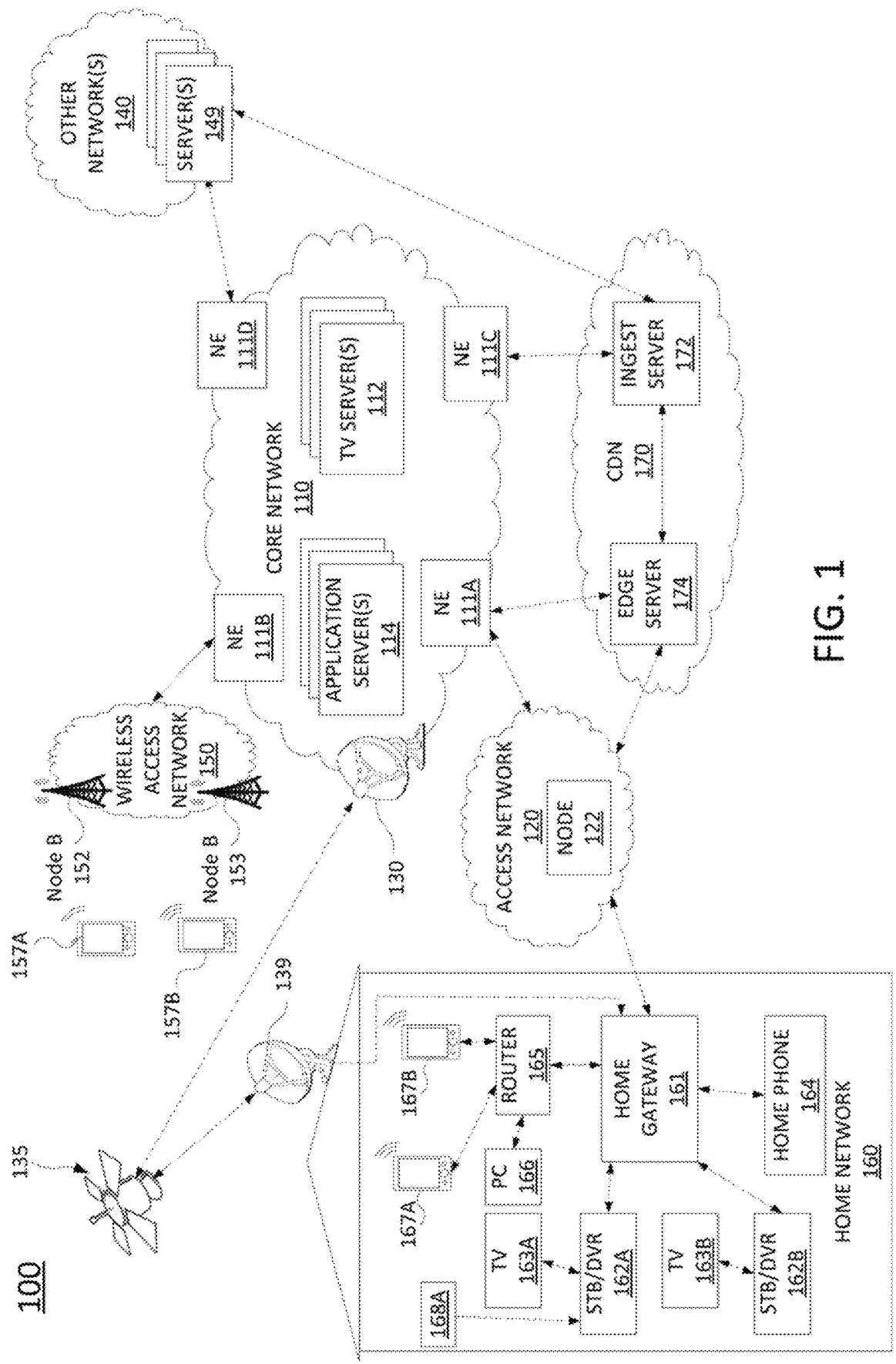
FIG. 1 illustrates an example network related to the present disclosure.

A variety of factors may affect users' quality of experience for video streaming. These include video stalls as well as long latency and poor video/audio quality. Examples of the present disclosure relate to client side adaptive bitrate (ABR) streaming. In particular, in one example, a main mapping function uses a current video buffer level to decide the next variant based on a linear function between bitrate and buffer occupancy level. The main mapping function is qualified by three additional functions referred to herein as a time-out function, a buffer offset function, and a startup function which use capacity estimation for selecting the next variant. Examples of the present disclosure have outperformed other client side systems across a variety of metrics including re-buffering ratio (including video pauses), average displayed bitrate, video startup time, and network data consumed.

Video delivery technology has shifted from connection-oriented video transport protocols such as Real Time Messaging Protocol (RTMP) and Real Time Streaming Protocol (RTSP) to connectionless, e.g., Hypertext Transfer Protocol (HTTP)-based, adaptive streaming protocols, such as Moving Picture Experts Group (MPEG) Dynamic Adaptive Streaming over HTTP (DASH). A common feature of HTTP-based adaptive streaming protocols is the storage and delivery of a video program in multiple files (chunks) associated with segments of the video program and having different encoding bitrates, with the files linked together by a manifest file, or "index file" that defines all of the segments, and the available video chunks (variants) for the segments of the video program.

Adaptive bitrate (ABR) streaming over HTTP is widely adopted since it offers significant advantages in terms of both user-perceived quality and resource utilization for content and network service providers. Unlike video downloads that must complete fully before playback can begin, streaming video starts playing within seconds. With ABR-based streaming, each video is encoded at a number of different rates (called variants) and stored on servers as separate files. A video client running on a mobile device, home television, game console, web browser, etc. chooses which video rate to stream by monitoring network conditions and estimating the available network capacity. The function of the ABR algorithm is to select ABR variants (called representations in DASH) in real time to maximize video quality and minimize re-buffering events. Typically, a video client maintains a media cache (also referred to as a "buffer" or "video buffer"), by pre-fetching video chunks, then playback occurs from the cache. For each time segment of a video-on-demand (VoD) program/live channel, the video client selects which variant (chunk) of that time segment to download into the cache. Higher quality variants for a given segment are larger in size (data volume) and take longer to download than lower quality variants. In general, the goal is to download as high quality a variant as possible each time while keeping the buffer from going empty.

One approach to variant selection is channel capacity estimation, which uses media segment download time as an estimate of available channel bitrate. The video client selects a variant that most closely matches the channel bitrate without exceeding it. In an environment where throughput is highly variable, such as a mobile network, accurate estimation of future channel capacity is challenging. Another approach uses a current buffer level, instead of estimated channel bandwidth, to select the variant. As with capacity estimation, the objective is to balance the flow of data into the buffer with the outflow, to keep the buffer from going empty or overflowing. Unlike with channel capacity estimation, for buffer occupancy-based approach, the actual buffer level is used to select the next variant, e.g., with a linear, or approximately linear, mapping function. The higher the current buffer level, the higher the variant bitrate selected for the next segment, and vice versa: the lower the buffer level, the lower the variant bitrate selected. This ensures conservative behavior, e.g., selecting minimum quality/variant size, when the buffer is low and aggressive behavior, e.g., selecting maximum quality/variant size, when the buffer is full or nearly so.

The buffer occupancy-based approach is motivated by the highly variable channel throughput experienced by mobile devices, which makes accurate capacity estimation difficult. The buffer level can be considered a more reliable estimator of channel capacity than an instantaneous measurement from a video chunk download. For instance, it may be assumed that a given buffer occupancy level is only reached with sustained availability of a certain channel bitrate. Said another way, the buffer could not have filled up to given level if the available channel bitrate were not sufficient to fill it to such level.

As mentioned above, in one example, the present disclosure features a main mapping function that uses a current video buffer level to decide the next variant based on a linear function between bitrate and buffer occupancy level. In addition, in one example, the main mapping function is qualified by any one or more additional functions referred to herein as a time-out function, a buffer offset function, and a startup function. In one example, VoD and live streaming have different buffer sizes and segment sizes. Accordingly, examples of present disclosure are separately tailored to VoD and live stream applications. In one example, a video may automatically detect the type of stream (VoD or live) and apply the correct version. It should also be noted that although examples of the present disclosure are described primarily in connection with a video client and video streaming, examples of the present disclosure may be similarly applied to other types of streaming media, such as adaptive bitrate streaming audio. These and other aspects of the present disclosure are described in greater detail below in connection with the examples of FIGS. 1-9.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140, content distribution network (CDN) 170, and/or the Internet in general. For instance, connections between core network 110, access network 120, home network 160, CDN 170, wireless access network 150 and other networks 140 may comprise the Internet in general, internal links under the control of single telecommunication service provider network, links between peer networks, and so forth.

In one example, wireless access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB). In one example, wireless access network 150 may be controlled and/or operated by a same entity as core network 110.

In one example, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, wireless access network 150, access network 120, and so forth. As shown in FIG. 1, core network 110 may also include a plurality of television (TV) servers 112, and a plurality of application servers 114. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may include content server(s) to store scheduled television broadcast content for a number of television channels, video-on-demand (VoD) programming, local programming content, and so forth. Alternatively, or in addition, content providers may stream various contents to the core network 110 for distribution to various subscribers, e.g., for live content, such as news programming, sporting events, and the like. Television servers 112 may also include advertising server(s) to store a number of advertisements that can be selected for presentation to viewers, e.g., in the home network 160 and at other downstream viewing locations. For example, advertisers may upload various advertising content to the core network 110 to be distributed to various viewers. Television servers 112 may also include interactive TV/video-on-demand (VoD) server(s), as described in greater detail below.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between home network 160 and core network 110 relating to voice telephone calls, communications with web servers via other networks 140, content distribution network (CDN) 170 and/or the Internet in general, and so forth. In another example, access network 120 may be operated by a different entity from core network 110, e.g., an Internet service provider (ISP) network.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

As illustrated in FIG. 1, core network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. In one example, application servers 114 may include data storage servers to receive and store manifest files regarding adaptive bitrate streaming video programs maintained within TV servers 112 and/or available to subscribers of core network 110 and stored in server(s) 149 in other networks 140. It should be noted that the foregoing are only several examples of the types of relevant application servers 114 that may be included in core network 110 for storing information relevant to providing various services to subscribers.

In accordance with the present disclosure, other networks 140 and servers 149 may comprise networks and devices of various content providers of adaptive bitrate streaming video programs. In one example, each of servers 149 may also make available manifest files which describe the segments and/or video chunks of various video programs stored on the respective one of the servers 149. In particular, a segment may comprise a portion of a video program, such as a 2-10 second portion, for example. A video chunk (also referred to as a variant, or a "bitrate variant") may comprise an actual data file containing video and/or audio for a segment that is encoded at a particular bitrate. For instance, there may be several video chunks containing video and audio for the same segment of the video program, but which are encoded at different bitrates in accordance with an adaptive bitrate streaming protocol. Thus, an adaptive bitrate streaming video player may request and obtain any one of the different video chunks for a segment, e.g., depending upon a state of a video buffer of the adaptive bitrate streaming video player, depending upon network conditions, depending upon the access rights of the adaptive bitrate streaming video player to different encoding bitrates according to a subscription plan and/or for the particular video program, and so forth.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

Figure 5:
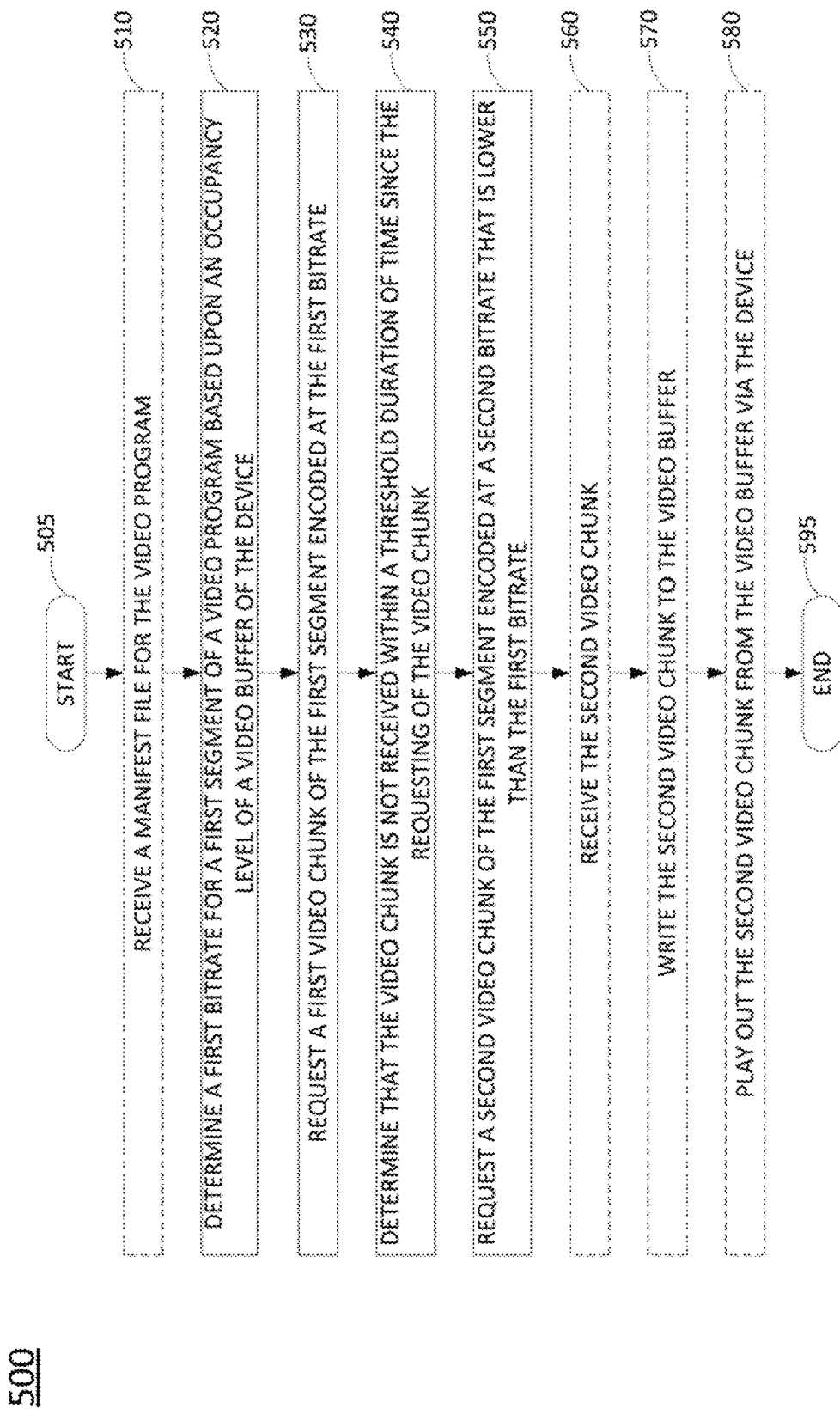
FIG. 5 illustrates a flowchart of an example method for providing a timeout for an adaptive bitrate streaming video chunk download.
Figure 6:
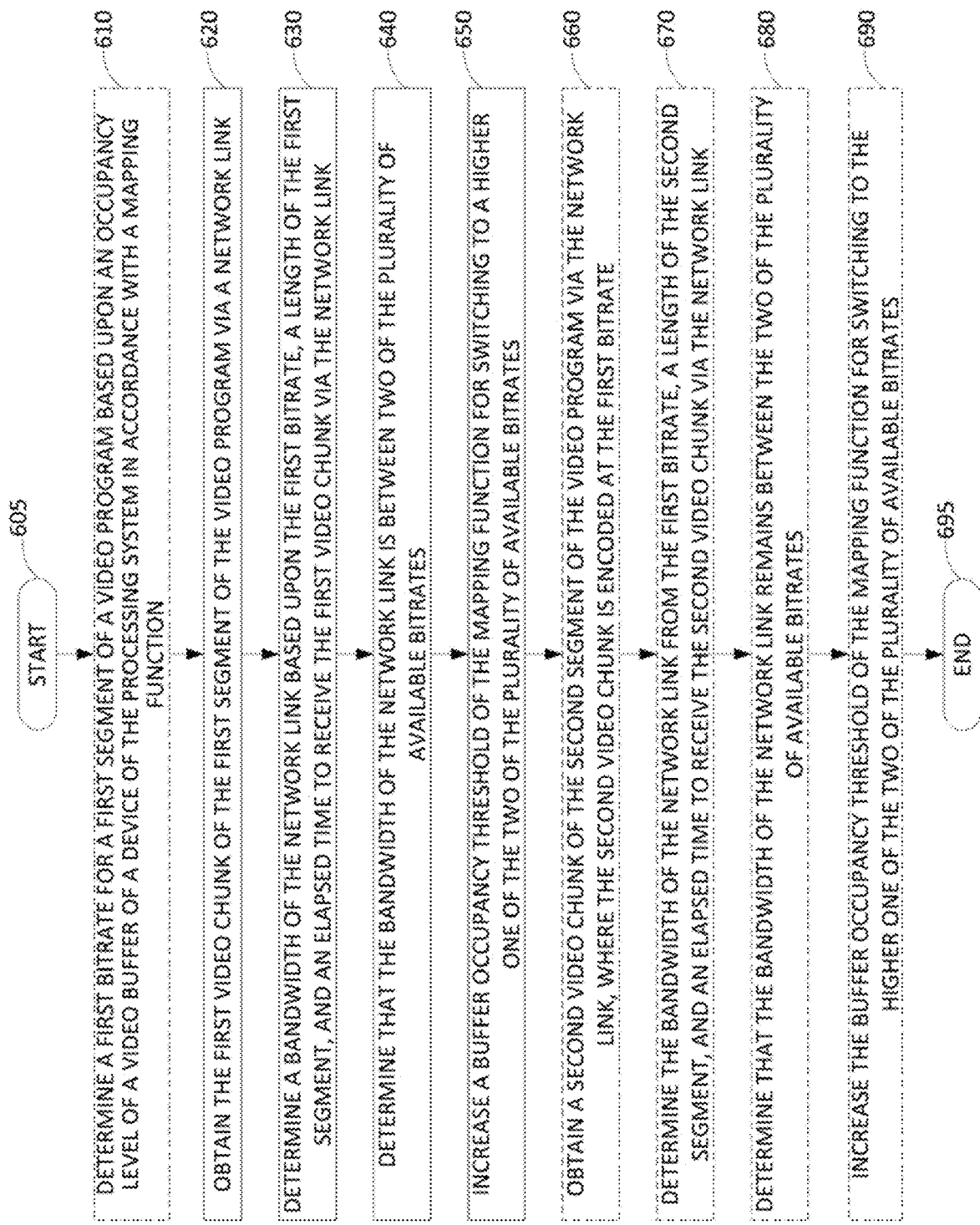
FIG. 6 illustrates a flowchart of an example method for increasing a buffer occupancy threshold of an adaptive bitrate streaming mapping function.
Figure 7:
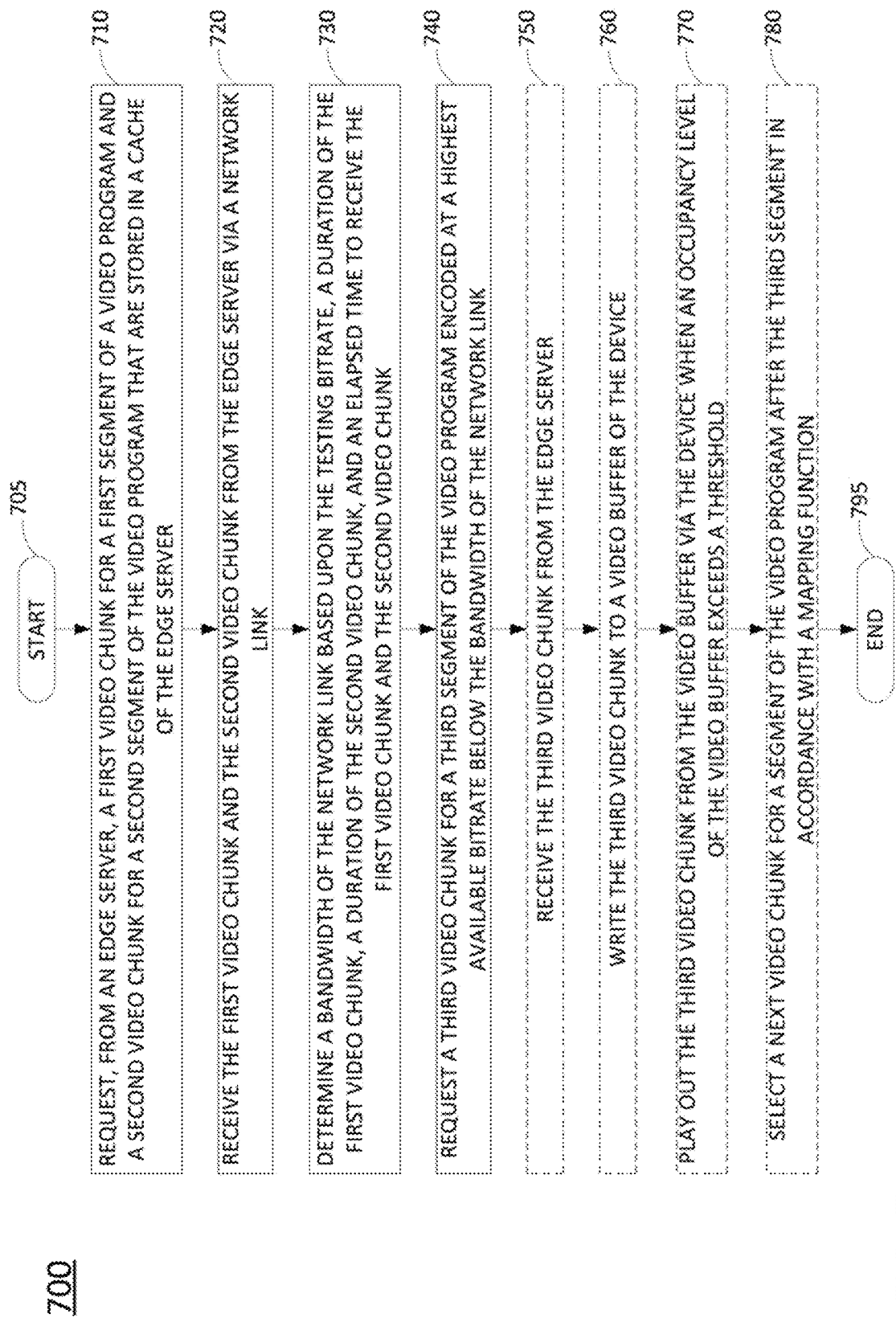
FIG. 7 illustrates a flowchart of an example method for filling an adaptive bitrate streaming video buffer for live video streaming.
Figure 8:
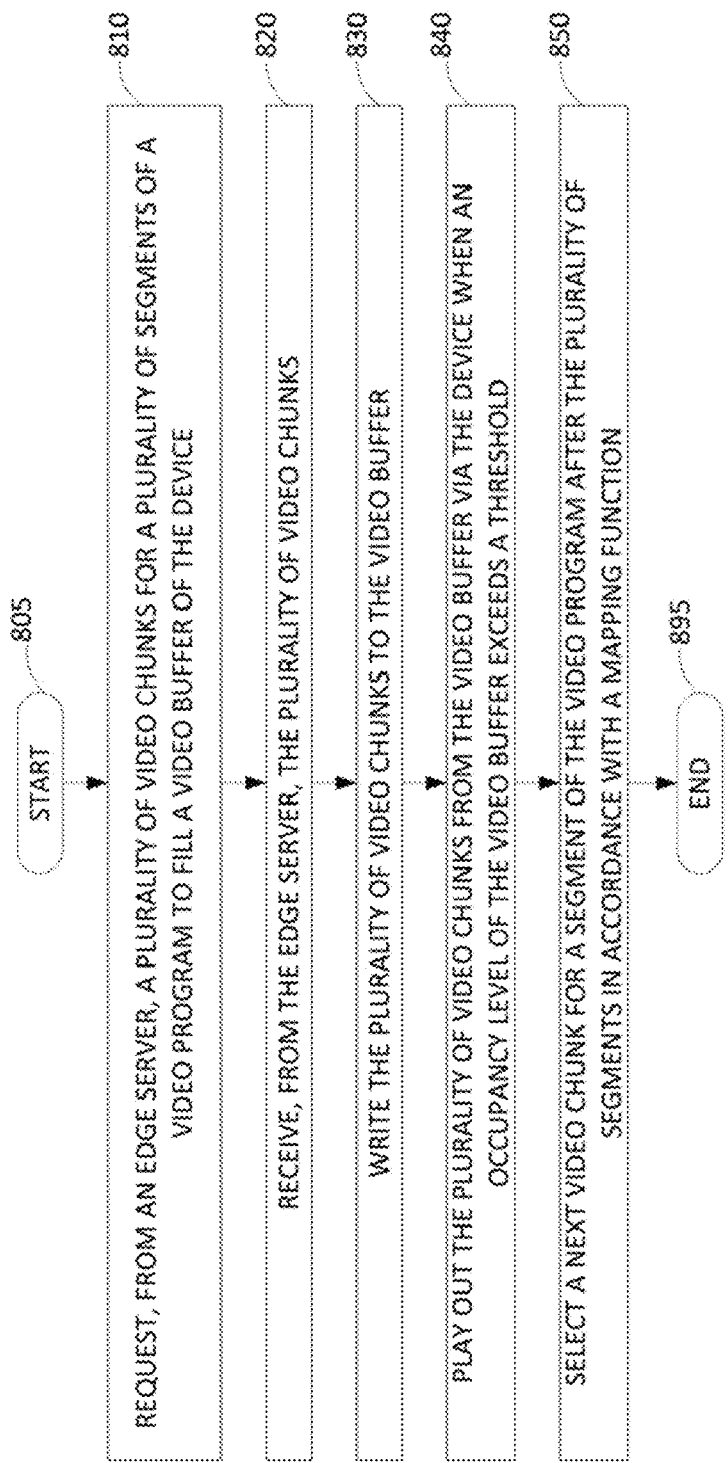
FIG. 8 illustrates a flowchart of an example method for filling an adaptive bitrate streaming video buffer for recorded video streaming.

In one example, one or both of the STB/DVR 162A and STB/DVR 162B may comprise all or a portion of a computing device or system, such as computing system 900, and/or processing system 902 as described in connection with FIG. 9 below, specifically configured to perform various steps, functions, and/or operations for providing a timeout for an adaptive bitrate streaming video chunk download, increasing a buffer occupancy threshold of an adaptive bitrate streaming mapping function, and/or for filling an adaptive bitrate streaming video buffer for live or recorded video streaming. Among other functions, STB/DVR 162A and STB/DVR 162B may comprise adaptive bitrate streaming video players capable of playing adaptive bitrate streaming video programs in formats such as Moving Picture Expert Group (MPEG) .mpeg files, .mov files, .mp4 files, .3gp files, .f4f files, .m3u8 files, or the like. A flowchart of an example method of providing a timeout for an adaptive bitrate streaming video chunk download is illustrated in FIG. 5 and described in greater detail below. A flowchart of an example method of increasing a buffer occupancy threshold of an adaptive bitrate streaming mapping function is illustrated in FIG. 6 and described in greater detail below. A flowchart of an example method of filling an adaptive bitrate streaming video buffer for live video streaming is illustrated in FIG. 7 and described in greater detail below. A flowchart of an example method of filling an adaptive bitrate streaming video buffer for recorded video streaming is illustrated in FIG. 8 and described in greater detail below. Although STB/DVR 162A and STB/DVR 162B are illustrated and described as integrated devices with both STB and DVR functions, in other, further, and different examples, STB/DVR 162A and/or STB/DVR 162B may comprise separate STB and DVR devices.

It should be noted that in one example, another device may provide one or more operations or functions for providing a timeout for an adaptive bitrate streaming video chunk download, increasing a buffer occupancy threshold of an adaptive bitrate streaming mapping function, and/or for filling an adaptive bitrate streaming video buffer for live or recorded video streaming, as described herein, and may comprise an adaptive bitrate streaming video player capable of playing adaptive bitrate streaming video programs. For instance, one or more of mobile devices 157A, 157B, 167A and 167B, and/or PC 166 may also comprise all or a portion of a computing device or system, such as computing system 900, and/or processing system 902 as described in connection with FIG. 9 below, specifically configured to perform various steps, functions, and/or operations for providing a timeout for an adaptive bitrate streaming video chunk download, increasing a buffer occupancy threshold of an adaptive bitrate streaming mapping function, and/or for filling an adaptive bitrate streaming video buffer for live or recorded video streaming, as described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 9 and discussed below) or multiple computing devices collectively configured to perform various steps, functions, and/or operations in accordance with the present disclosure.

Network 100 may also include a content distribution network (CDN) 170. In one example, CDN 170 may be operated by a different entity from core network 110. In another example, CDN 170 may be operated by a same entity as core network 110, e.g., a telecommunication service provider. In one example, the CDN 170 may comprise a collection of cache servers distributed across a large geographical area and organized in a tier structure. The first tier may comprise a group of servers that access content web servers (origin servers) to pull content into the CDN 170, referred to as an ingestion servers, e.g., ingest server 172. The content may include video programs, content of various webpages, electronic documents, video games, etc. A last tier may comprise cache servers which deliver content to end user, referred to as edge caches, or edge servers, e.g., edge server 174. For ease of illustration, a single ingest server 172 and a single edge server 174 are shown in FIG. 1. In between the ingest server 172 and edge server 174, there may be several layers of servers (omitted from the illustrations), referred to as the middle tier. In one example, the edge server 174 may be multi-tenant, serving multiple content providers, such as core network 110, content providers associated with server(s) 149 in other network(s) 140, and so forth. In one example, edge server 174 may comprise an adaptive bitrate streaming video server. In addition, in one example, edge server 174 may comprise all or a portion of a computing device or system, such as computing system 900, and/or processing system 902 as described in connection with FIG. 9 below, specifically configured to perform various steps, functions, and/or operations in connection with providing a timeout for an adaptive bitrate streaming video chunk download, increasing a buffer occupancy threshold of an adaptive bitrate streaming mapping function, and/or for filling an adaptive bitrate streaming video buffer for live or recorded video streaming.

As mentioned above, TV servers 112 in core network 110 may also include one or more interactive TV/video-on-demand (VoD) servers. In one example, an interactive TV/VoD server may comprise all or a portion of a computing device or system, such as computing system 900, and/or processing system 902 as described in connection with FIG. 9 below, specifically configured to perform various steps, functions, and/or operations in connection with providing a timeout for an adaptive bitrate streaming video chunk download, increasing a buffer occupancy threshold of an adaptive bitrate streaming mapping function, and/or for filling an adaptive bitrate streaming video buffer for live or recorded video streaming, as described herein. Among other things, an interactive TV/VoD server may function as a server for STB/DVR 162A and/or STB/DVR 162B, one or more of mobile devices 157A, 157B, 167A and 167B, and/or PC 166 operating as a client for requesting and receiving a manifest file for an adaptive bitrate streaming video program, as described herein. For example, STB/DVR 162A may present a user interface and receive one or more inputs (e.g., via remote control 168A) for a selection of an adaptive bitrate streaming video program. STB/DVR 162A may request the video program from an interactive TV/VoD server, which may retrieve the manifest file for the video program from one or more of application servers 114 and provide the manifest file to STB/DVR 162A. STB/DVR 162A may then obtain video chunks of video segments of the video program as identified in the manifest file.

In one example, the manifest file may direct the STB/DVR 162A to obtain the video chunks from edge server 174 in CDN 170. The edge server 174 may already store the video chunks of the video program and may deliver the video chunks upon a request from the STB/DVR 162A. However, if the edge server 174 does not already store the video chunks, upon request from the STB/DVR 162A, the edge server 174 may in turn request the video chunks from an origin server. The origin server which stores chunks of the video program may comprise, for example, one of servers 149 or one of TV servers 112. The chunks of the video program may be obtained from an origin server via ingest sever 172 before passing to edge server 174. In one example, the ingest server 172 may also pass the video chunks to other middle tier servers and/or other edge servers (not shown) of CDN 170. The edge server 174 may then deliver the video chunks to the STB/DVR 162A and may store the video chunks until the video chunks are removed or overwritten from the edge server 174 according to any number of criteria, such as a least recently used (LRU) algorithm for determining which content to keep in the edge server 174 and which content to delete and/or overwrite.

It should be noted that a similar process may involve other devices, such as TV 163A or TV 163B (e.g., "smart" TVs), mobile devices 176A, 167B, 157A or 157B obtaining a manifest file for a video program from one of TV servers 112, from one of servers 149, etc., and requesting and obtaining video chunks of the video program from edge server 174 of CDN 170. In this regard, it should be noted that edge server 174 may comprise a server that is closest to the requesting device geographically or in terms of network latency, throughput, etc., or which may have more spare capacity to serve the requesting device as compared to other edge servers, which may otherwise best serve the video program to the requesting device, etc. However, depending upon the location of the requesting device, the access network utilized by the requesting device, and other factors, the chunks of the video program may be delivered via various networks, various links, and/or various intermediate devices. For instance, in one example, edge server 174 may deliver video chunks to a requesting device in home network 160 via access network 120, e.g., an ISP network. In another example, edge server 174 may deliver video chunks to a requesting device in home network 160 via core network 110 and access network 120. In still another example, edge server 174 may deliver video chunks to a requesting device such as mobile device 157A or 157B via core network 110 and wireless access network 150.

Further details regarding the functions that may be implemented by edge server 174, STBs/DVRs 162A and 162B, mobile devices 157A, 157B, 167A and 167B, and/or PC 166 are discussed in greater detail below in connection with the examples of FIGS. 2-9. In addition, those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

As mentioned above, in one example, the present disclosure features a main mapping function that uses a current video buffer level to decide the next variant based on a linear function between bitrate and buffer occupancy level. In addition, in one example, the main mapping function is qualified by any one or more additional functions referred to herein as a time-out function, a buffer offset function, and a startup function.

Figure 2:
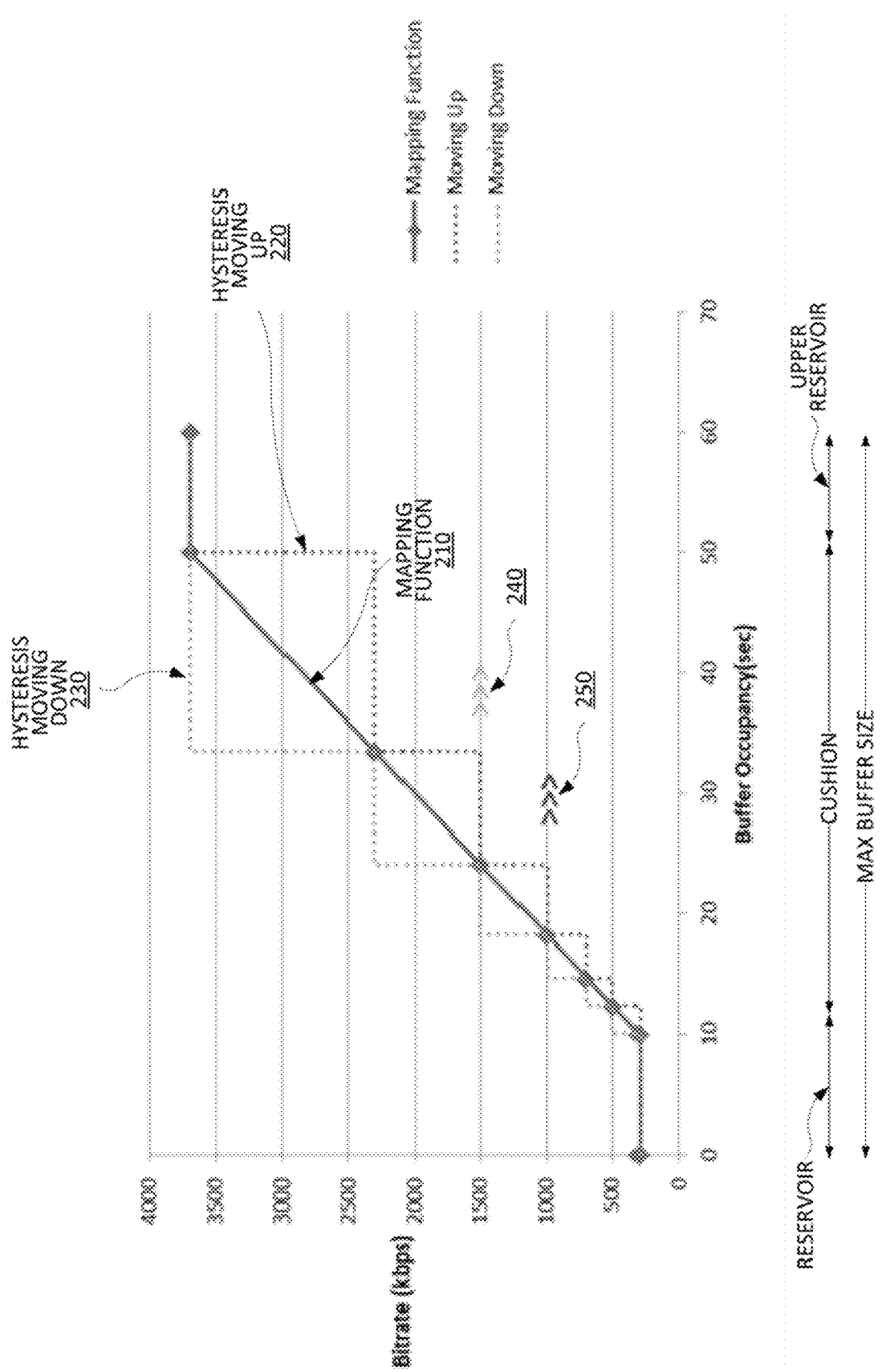
FIG. 2 illustrates an example mapping function with buffer offset in accordance with the present disclosure.

In one example, the mapping function is a linear function (or near linear function) between bitrates of each variant (addressed in the manifest file) and the current buffer occupancy level. FIG. 2 shows an example rate map 200 for a stream with 7 variants. The rate map 200 includes the mapping function 210. The vertical axis indicates the bitrate and the horizontal axis indicates the buffer occupancy level (in seconds). In the present example, the bitrates for the seven variants are 300 kbps, 500 kbps, 700 kbps, 1000 kbps, 1500 kbps, 2300 kbps, and 3700 kbps. In one example, hysteresis is applied to the mapping function 200, e.g., in order to avoid rapid switching between bitrates when the buffer occupancy level fluctuates. For example, the dotted line 220 below the mapping function 200 indicates the hysteresis when moving up bitrate levels (when the buffer occupancy level is increasing). Similarly, the dotted line 230 above the mapping function 200 indicates the hysteresis when moving down bitrate levels (when the buffer occupancy level is decreasing). The following parameters are used in the mapping function:

Variant bitrates BR(1, . . . , N): The bitrate of each variant reported in the manifest file, where "N" is the number of variants. In the present example, and as illustrated in FIG. 2 the stream includes seven variants (N=7).

Maximum buffer size: This value depends on several parameters such as device storage and acceptable latency in live streaming. In one example, the buffer size may be 30-60 seconds for live streaming and 2-3 minutes for VoD streaming. In the example below, the maximum buffer size is selected to be 60 seconds.

Reservoir: To avoid any video interruption, there should be at least one segment in the buffer before switching to any higher variant. To handle this, a reservoir 240 is provided at the beginning of the rate map 200. In one example, the reservoir is one segment duration. For the example below the reservoir is selected to be 10 seconds.

Cushion: The portion of the buffer between the reservoir and the point where the buffer reaches the maximum is referred to as the cushion. For the example below the cushion is selected to be 40 seconds.

Switching Points, SW(1, . . . , N): During startup, the video client parses the manifest file and obtains all of the variant bitrates. Based on the values chosen for maximum buffer size, cushion and reservoir, switching points are calculated based on the following equation, where SW(1) is the reservoir and SW(N) is the reservoir plus cushion:

$$SW(1<k<N)=SW(1)+(SW(N)-SW(1))*(BR(K)-BR(1))/(BR(N)-BR(1)). \quad \text{Equation 1}$$

The following switching points are calculated based on the following variant bitrates (reported in the manifest file)

and the above equation: BR(1)=300, SW(1)=10; BR(2)=500, SW(2)=12.35; BR(3)=700, SW(3)=14.7; BR(4)=1000, SW(4)=18.23; BR(5)=1500, SW(5)=24.11; BR(6)=2300, SW(6)=33.52; BR(7)=3700, SW(7)=50. These values are also shown in mapping function 210 of FIG. 2.

Figure 3:
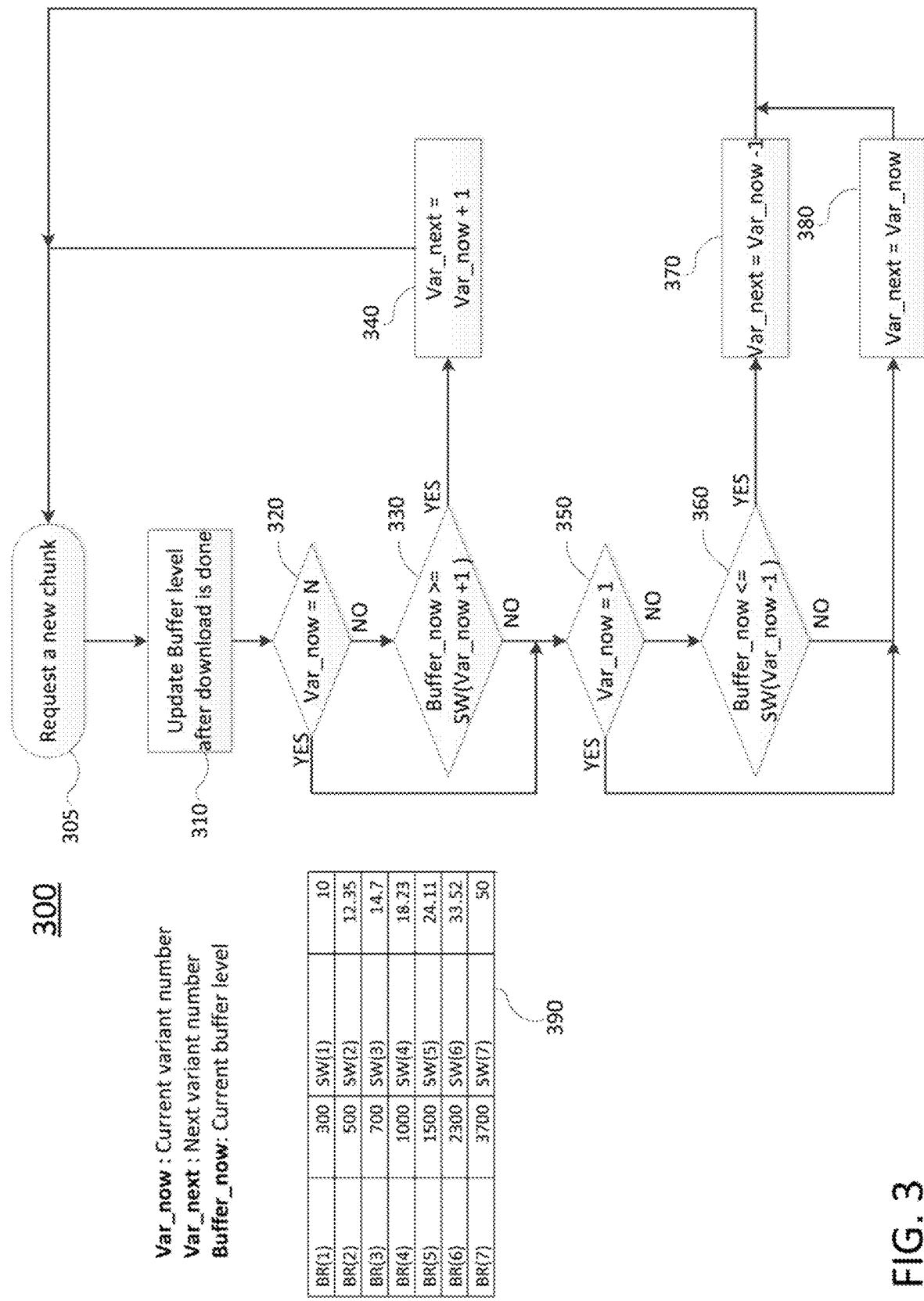
FIG. 3 illustrates a flowchart of an example process of a main mapping to decide a next variant based on a buffer occupancy level.

Following the calculation of switching points, FIG. 3 illustrates a flowchart of a process 300 to decide the next variant based on the buffer occupancy level. The process 300 may be performed by a video client, for example. The process 300 begins at operation 305 where a new chunk for a video segment is requested in accordance with a next variant number (Var_next). Initially, the current variant number (Var_now) and the next variant number (Var_next) may be set to the lowest variant level (1). In subsequent iterations of the process 300, these variables may range anywhere between 1 and N (the highest variant level, which in the present example is 7). At operation 310, the buffer level (Buffer_now) is updated after downloading the chunk for the segment.

At operation 320, the video client may determine whether the current variant number (Var_now) is at the highest available variant level (N). If "yes," the process 300 may proceed to operation 350. Otherwise, if "no," the process 300 may proceed to operation 330. At operation 330, the video client may determine whether the current buffer level (Buffer_now) is greater than or equal to the switching point for the next variant higher (SW(Var_now+1)) than the current variant number (SW(Var_now)). If "no," the process 300 may proceed to operation 350. Otherwise, if "yes," the process 300 may proceed to operation 340. For ease of reference, the switching points and corresponding bitrate variants/variant numbers are set forth in FIG. 3 at table 390. At operation 340, the next variant level is set to the variant one level above the current variant number (Var_now+1). The process 300 may then return to operation 305 to request a new chunk for a video segment in accordance with the next variant number (Var_next).

At operation 350, the video client may determine whether the current variant number (Var_now) is the lowest variant number (1). If "yes," the process 300 may proceed to operation 380 where the next variant number (Var_next) is set to the current variant number (Var_now). In other words, the variant number remains unchanged. Following operation 380, the process 300 may return to operation 305. If at operation 350 it is determined that the current variant number (Var_now) is not the lowest variant number (1), the process may proceed to operation 360. At operation 360, the video client may determine whether the buffer occupancy level (Buffer_now) is less than or equal to the switching point for the next lower variant (SW(Var_now−1)) below the current variant number (SW(Var_now)). If "no," the process 300 may proceed to operation 380. Otherwise, the process 300 may proceed to operation 370 where the next variant level (Var_next) is set to a variant level one level below (Var_now−1) the current variant level (Var_now). Following operation 370, the process 300 may return to operation 305. The process 300 may continue until the video is completed or the video client is turned off.

As described above, the main mapping function may be qualified by one or more additional functions. A first such function is a time-out function. The mapping function decides the next variant based on the buffer level after the download of a chunk for a current segment is finished. For various reasons, such as a large bandwidth drop, a long download time, etc., the mapping function may fail to react. After the download of a chunk is completed, a large portion of buffer may be depleted. In addition, it may be too late to switch to a lower variant to avoid a rebuffering event. The time-out function addresses this situation by interrupting a download of a chunk if the download takes longer than a timeout threshold and switching to a lower variant. In one example, the typical buffer size for live streaming is smaller than the typical buffer size for VoD streaming. Accordingly, examples of the present disclosure may include two different approaches for live and VoD streaming.

Figure 4:
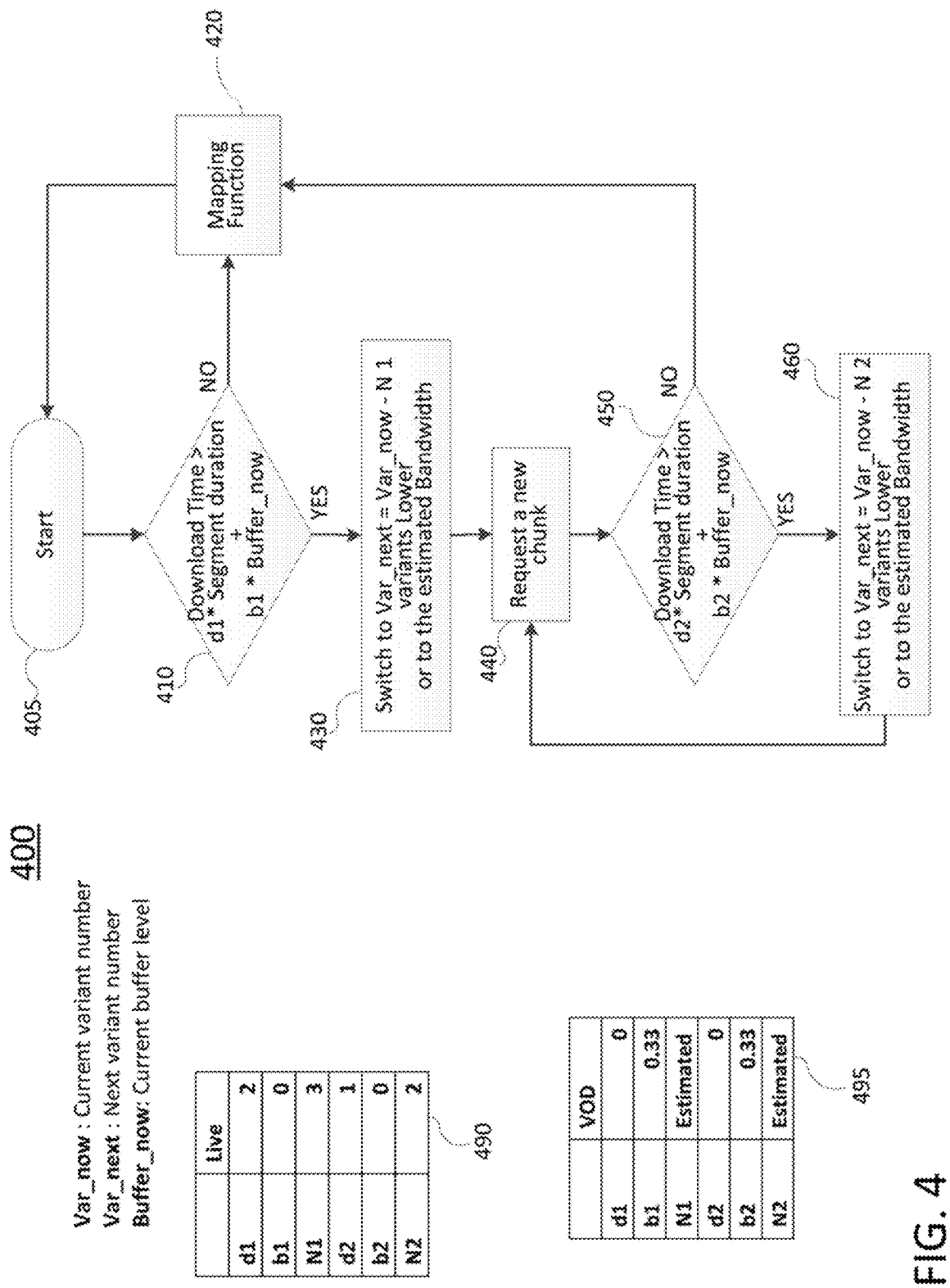
FIG. 4 illustrates a flowchart of a process for a timeout function.

FIG. 4 illustrates a flowchart of a process 400 for a timeout function. The process 400 may be performed by a video client, for example. The process 400 begins at operation 405 and proceeds to operation 410. At operation 410, the video client may determine whether the download time exceeds a first timeout. The first timeout may be based upon the segment duration and the buffer occupancy level. As shown in the respective tables for live streaming (490) and for VoD (495), the first timeout (d1*Segment duration+ b1*Buffer level) may be different in accordance with the variables d1 and b1. For the example process 400, the respective variables/parameters for live streaming and for VoD streaming are illustrated in FIG. 4 in tables 490 and 495, respectively. When the download time does not exceed the first timeout, the process 400 may proceed to a mapping function 420. In one example, the mapping function 420 may comprise the operations of process 300 discussed above and illustrated in FIG. 3. In one example, the operations of process 400 may return to the start 405, for a subsequent segment.

If at operation 410 it is determined that the download time exceeds the first timeout, the process 400 may proceed to operation 430. At operation 430, the video client may change the next variant number (Var_next) to a variant that is N1 variant levels lower than the current variant number (Var_now). For instance, in one example, for live video streaming according to table 490, N1 is 3. Therefore, the next variant number may be three variant levels lower than the current variant number. If there are not three lower variant levels available, the video client may switch to the lowest available variant level (BR(1)). In another example, for VoD streaming, N1 is selected in accordance with an estimated bandwidth of the network between the video client and the server. In one example, the estimated bandwidth may be calculated in accordance with Equation 2:

Estimated bandwidth=current variant bitrate*(portion of segment duration)/timeout    Equation 2

The current variant bandwidth may be found in table 390 of FIG. 3 (e.g., in kbps). If information about the percentage of the segment (or more particularly a chunk of the current variant for the segment) downloaded before the first timeout is not available, the estimated bandwidth may alternatively be calculated in accordance with Equation 3:

Estimated bandwidth=current variant bitrate*segment duration/timeout    Equation 3

At operation 440, the video client may request from the server a new chunk for a next segment in accordance with the next variant number (Var_next). In addition, the video client may update the current variant number (Var_now) to be equivalent to the next variant number (Var_next) that was used for the request.

At operation 450, the video client may determine whether the download time exceeds a second timeout. The second timeout may be based upon the segment duration and the buffer occupancy level. As shown in the respective tables for live streaming (490) and for VoD (495), the second timeout (d2*Segment duration+b2*Buffer level) may be different in accordance with the variables d2 and b2. For the example process 400, the respective variables/parameters for live streaming and for VoD streaming are illustrated in FIG. 4 in tables 490 and 495, respectively.

When the download time does not exceed the second timeout, the process 400 may proceed to mapping function 420 (e.g., the operations of process 300 of FIG. 3). When the download time exceeds the first timeout, the process 400 may proceed to operation 460. At operation 460, the video client may change the next variant number (Var_next) to a variant that is N2 variant levels lower than the current variant number (Var_now). For instance, in one example, for live video streaming according to table 490, N2 is 2. Therefore, the next variant number may be two variant levels lower than the current variant number. If there are not two lower variant levels available, the video client may switch to the lowest available variant level (BR(1)). In another example, for VoD streaming, N2 is selected in accordance with an estimated bandwidth of the network between the video client and the server. In one example, the estimated bandwidth may be calculated in accordance with Equation 2 or Equation 3 above. Following operation 460, the process 400 may return to operation 440.

In one example, operations 450 and 460 may be substantially similar to the operations 410 and 430, respectively, only with different variables/parameters. In particular, operations 450 and 460 may provide for additional drops in the variant bit-rate in the event that the drops in the variant bit-rate provided via operations 410 and 430 is still not considered sufficient to address the circumstances causing the first timeout to be exceeded. It should be noted that the examples of tables 490 and 495 are provided for illustrative purposes only. Thus, in other, further, and different examples, different variables/parameters may be implemented for both live and/or VoD streaming. As just one example, N1 for live streaming may be selected such that a bitrate for a next variant is at least a factor of 2 lower than the bitrate for a current variant, a factor of 2.25 lower, a factor of 2.75 lower, etc. Thus, depending upon the number of variant bitrate levels available and/or the bitrates of the different variants, the number of variant bitrate levels to be dropped according to N1 may be different for different implementations. In another example, the timeout function for live streaming may utilize an estimated bandwidth, similar to the example described above with respect to VoD streaming. Thus, these and other modifications are all contemplated within the scope of the present disclosure. The process 400 may continue until the video is completed or the video client is turned off.

A second function qualifying the main mapping function is a buffer offset function. When the network bandwidth is stable and is lower than the highest variant bit-rate, the buffer usage is not efficient and remains lower than the maximum. For example, if the network bandwidth is stable between the bitrates of the second and third highest variants, the buffer level remains between the switching points of the second and third highest variants. The buffer offset function enables the buffer occupancy level to increase without switching to the higher variant when the network bandwidth is stable. In one example, the bandwidth is estimated in accordance with Equation 4:

$$\text{Estimated bandwidth} = \text{current variant bitrate} \ast \text{segment duration}/\text{download time} \quad \text{Equation 4}$$

In one example, if the estimated bandwidth is between a current variant bit-rate and a next higher variant bit-rate, it is considered a stable condition, and a video client may add some offset to the switching point between the two variants to avoid switching. In one example, the offset may be calculated in accordance with Equation 5:

$$\text{Buffer offset} = \text{segment duration} - \text{download time} \quad \text{Equation 5}$$

Referring again to FIG. 2, an example may involve a current variant being variant 5, and with the estimated bandwidth being 1700 kbps, which is between the bitrates for variants 5 and 6 (where BR(5)=1500 kbps and BR(6)=2300 kbps according to table 390 of FIG. 3). In one example, the period of time over which the network bandwidth is considered "stable" may be a plurality of segments. For instance, where the estimated bandwidth remains between two variant bitrate levels for three segments, it may be considered a stable condition and the buffer offset may then be applied. However, in another example, the period of time over which the network bandwidth is considered "stable" may be a single segment. In addition, in one example, the estimated bandwidth may be for a single variant/chunk.

The application of a buffer offset is illustrated by arrows 240 in FIG. 2. For instance, the nominal switching point between variant 5 (1500 kbps) and variant 6 (2300 kbps) moving up may be a buffer occupancy level of 33.52 seconds (see table 390 of FIG. 3). Without the buffer offset function, if the buffer occupancy level is 34 seconds, the video client may switch to the higher variant, variant 6. However, with estimated network bandwidth remaining stable at 1700 kbps, the buffer occupancy level will fall, since the bitrate for variant 6 is 2300 kpbs and the network bandwidth is only 1700 kbps. When the buffer occupancy falls below 24.11 seconds (SW(5) in table 390 of FIG. 3), the video client may then switch to the lower variant (variant 5). With the estimated network bandwidth remaining stable at 1700 kbps, the buffer occupancy level will rise, since the bitrate for variant 5 is 1500 kbps and the network bandwidth is 1700 kbps. Thus, the video client may continue to cycle between variant bitrate levels 5 and 6. In addition, the buffer occupancy may not increase to its capacity, e.g., 60 seconds as illustrated in the example of FIG. 2.

With the buffer offset function, when the network bandwidth is stable the switching point (e.g., SW(6) in the present example) may be increased to a greater buffer occupancy level, the result being that the video client may continue to select variants at an available variant bitrate level just below the estimated network bandwidth and the buffer occupancy may increase to capacity. In one example, for each time period (e.g., one segment, or a plurality of segments) for which the bandwidth remains stable (between the same variant bitrate levels), the buffer offset function may increase the switching point (e.g., per Equation 5). Thus, the switching point may be increased in increments to a maximum of the maximum buffer size. FIG. 2 illustrates additional arrows 250 which may indicate a buffer offset in another example where the network bandwidth may be stable at 1200 kbps (between variant 4 (1000 kbps) and variant 5 (1500 kbps)). For instance, SW(4) may be increased per Equation 5. It should be noted that Equation 5 is just one example of how the switching point may be increased. For instance, in another example, the switching point may be increased in accordance with a fixed offset (e.g., for each time period over which the bandwidth is considered stable, increase the switching point by 2 seconds of buffer occupancy, 3 seconds of buffer occupancy, etc.). In another example, the switching point may be increased by a value that is 0.5 seconds less than a buffer offset calculated according to Equation 5, 0.25 seconds less than such a buffer offset, and so forth. Thus, these and other modifications are all contemplated within the scope of the present disclosure.

Another function qualifying the main mapping function is a startup function. The startup function accounts for several preferences, such as a viewer preference for a short start time, a preference to avoid video pause/rebuffering, and a preference for higher quality video. In the present startup function, startup times are kept to a maximum of a few seconds. In addition, the startup function aims to fill the buffer quickly to avoid any possible video pause. Lastly, it is considered acceptable to start with low quality video but the startup function aims to switch to higher video quality quickly.

In one example, the startup function may have different implementations for live streaming and VoD streaming, respectively. For instance, for live streaming, in one example it is assumed that the CDN cache (e.g., an edge server cache) is one minute. In other words, content from one minute in the past is available from the video server. In one example, the video client may request two segments of the second lowest variant from one minute in the past and estimate the bandwidth by averaging two estimated bandwidths, e.g., in accordance with Equation 6:

Estimated bandwidth=second variant bandwidth*
(m*segment1 duration/download time+
(1−m)*segment2 duration/download time)    Equation 6

In one example, "m" may be 0.5. In another example, "m" may be selected to give a greater weighting to the more recent of the two segments, e.g., 0.6, 0.75, etc. In one example, the startup function may comprise the video client selecting the highest variant below the estimated bandwidth to initially fill the buffer. In one example, the video client may start playing the video when the buffer is filled to at least a threshold buffer occupancy. For instance, in one example, the video may start when the buffer is at least 6 seconds filled, 8 seconds filled, 10 seconds filled, 12 seconds filled, etc.

For VoD streaming a slightly different approach may be implemented in one example. For instance, the video client may request as many segments from the second lowest variant as necessary to make the buffer full. Then, the video client may follow the main mapping function (e.g., process 300 of FIG. 3) to find the next variant. In one example, the video client may begin playing the video when the buffer is filled to at least a threshold buffer occupancy. For instance, in one example, the video may start when the buffer is at least 6 seconds filled, 8 seconds filled, 10 seconds filled, 12 seconds filled, etc. In one example, the video player may implement a shorter threshold for VoD streaming than for live streaming. In addition, in one example, for VoD content, the durations of the first few segment durations are made shorter than segments for the remainder of the video program to enable faster startup playback.

FIG. 5 illustrates a flowchart of a method 500 for providing a timeout for an adaptive bitrate streaming video chunk download, in accordance with the present disclosure. In one example, the method 500 is performed by a client device comprising a video client, e.g., STB/DVR 162A, STB/DVR 162B, one of the TVs 163A and 163B, PC 166, one of the mobile devices 157A, 157B, 167A, or 167B, and so forth, or any one more components thereof, such as a processing system, or by one of these devices in conjunction with other devices and/or components of network 100 of FIG. 1. In one example, the steps, functions, or operations of method 500 may be performed by a computing device or system 900, and/or a processing system 902 as described in connection with FIG. 9 below. For instance, the computing device 900 may represent any one or more components of a client device that is/are configured to perform the steps, functions and/or operations of the method 500. For illustrative purposes, the method 500 is described in greater detail below in connection with an example performed by a processing system, such as processing system 902. The method 500 begins in step 505 and proceeds to optional step 510 or to step 520.

At optional step 510, the processing system may receive a manifest file for the video program. In one example, the manifest file identifies a plurality of video chunks associated with a plurality of segments of the video program in accordance with an adaptive bitrate streaming protocol. The plurality of video chunks may include at least a first video chunk and a second video chunk for at least one segment of a plurality of segments of the video program. In one example, for each of the plurality of segments, the associated plurality of video chunks includes video chunks encoded at a plurality of different available bitrates. In one example, a uniform resource locator (URL) for the first video chunk and a uniform resource locator for the second video chunk are identified in the manifest file. For instance, the URL for the first video chunk and the URL for the second video chunk are both associated with an edge server of a content distribution network (CDN).

At step 520, the processing system determines a first bitrate for a first segment of a video program based upon an occupancy level of a video buffer of the device. In one example, the first bitrate is determined in accordance with a mapping function of buffer occupancy levels to a plurality of available bitrates. For instance, step 520 may comprise operations in accordance with the process 300.

At step 530, the processing system requests a first video chunk of the first segment encoded at the first bitrate. In one example, the first video chunk is requested from an edge server in accordance with the manifest file that may be received at optional step 510.

At step 540, the processing system determines that the video chunk is not received within a threshold duration of time since the requesting of the video chunk. In one example, the threshold (or "timeout") may be in accordance with operation 410 of the process 400 described above. For example, the threshold may be based upon the segment duration and the buffer occupancy level. In one example, the threshold (timeout) is based upon d1*Segment duration+ b1*Buffer level, where d1 and b1 may vary for VoD and live streaming application. For instance, the respective tables 490 and 495 of FIG. 4 provide example variables parameters for d1 and b1 for live streaming and for VoD streaming, respectively.

At step 550, the processing system requests a second video chunk of the first segment encoded at a second bitrate that is lower than the first bitrate. In one example, the second bitrate is at least two available bitrates lower than the first bitrate. In one example, the second bitrate is one of the plurality of available bitrates that is downscaled from the first bitrate by at least a factor of 2. In one example, step 550 may comprise operations in accordance with operations 430 and 440 of the process 400 described above. In one example, the second video chunk is requested from an edge server in accordance with the manifest file that may be received at optional step 510. In one example, the requesting the first video chunk at step 520 and the requesting the second video chunk at step 550 may comprise sending a message in accordance with a hypertext transfer protocol (HTTP) head method.

At optional step 560, the processing system may receive the second video chunk. At optional step 570, the processing system may write the second video chunk to the video buffer. In addition, at optional step 580, the processing system may play out the second video chunk from the video buffer via the device.

Following step 550, or one of optional steps 560-580, the method 500 proceeds to step 595 where the method ends.

It should be noted that the method 500 may be expanded to include additional iterations with respect to subsequent segments of the video program. In addition, in one example, the method 500 may include additional steps in accordance with operations 440-460 of the process 400. For instance, the processing system may further drop the bitrate for the segment if the second bitrate of step 550 is not sufficient and the lower bitrate chunk/segment is not received with a second threshold period of time.

FIG. 6 illustrates a flowchart of a method 600 for increasing a buffer occupancy threshold of an adaptive bitrate streaming mapping function, in accordance with the present disclosure. In one example, the method 600 is performed by a client device comprising a video client, e.g., STB/DVR 162A, STB/DVR 162B, one of the TVs 163A and 163B, PC 166, one of the mobile devices 157A, 157B, 167A, or 167B, and so forth, or any one more components thereof, such as a processing system, or by one of these devices in conjunction with other devices and/or components of network 100 of FIG. 1. In one example, the steps, functions, or operations of method 600 may be performed by a computing device or system 900, and/or a processing system 902 as described in connection with FIG. 9 below. For instance, the computing device 900 may represent any one or more components of a client device that is/are configured to perform the steps, functions and/or operations of the method 600. For illustrative purposes, the method 600 is described in greater detail below in connection with an example performed by a processing system, such as processing system 902. The method 600 begins in step 605 and proceeds to optional step 610 or to step 620.

At optional step 610, the processing system may determine a first bitrate for a first segment of a video program based upon an occupancy level of a video buffer (e.g., of a device of the processing system) in accordance with a mapping function. As referred to herein, the term "first" is used simply as a label and does not imply that a segment or chunk necessarily relates to a beginning segment of a video program.

At step 620, the processing system obtains the first video chunk of the first segment of the video program via a network link. The first video chunk may be encoded at a first bitrate of a plurality of available bitrates for segments of the video program in accordance with a mapping function of buffer occupancy levels to the plurality of available bitrates. In one example, the first bitrate for the first segment of the video program is determined based upon an occupancy level of a video buffer of the device in accordance with the mapping function at optional step 610 or step 620. For instance, the mapping function includes a plurality of video buffer occupancy level thresholds (switching points) for selecting, for a current segment of the video program, a next higher available bitrate from a bitrate for a previous segment of the video program (e.g., when the video buffer occupancy level exceeds a respective one of the thresholds).

At step 630, the processing system determines a bandwidth of the network link based upon the first bitrate, a length of the first segment, and an elapsed time to receive the first video chunk via the network link. For instance, in one example, step 630 may comprise estimating the bandwidth of the network link according to Equation 4 above.

At step 640, the processing system determines that the bandwidth of the network link is between two of the plurality of available bitrates. For instance, the plurality of available bitrates may be known in advance to the processing system according to an ABR streaming system design, or may be determined by the processing system from a manifest file for the video program which may indicate the available bitrates.

At step 650, the processing system increases a buffer occupancy threshold of the mapping function for switching to a higher one of the two of the plurality of available bitrates when it is determined that the bandwidth of the network link is between the two of the plurality of available bitrates. The buffer occupancy threshold may comprise a switching point as described above in connection with the examples of FIGS. 2 and 3. The switching points may be calculated by the processing system in accordance with the available bitrate variants and the size of the video buffer, or may be provided in the manifest file.

At optional step 660, the processing system may obtain a second video chunk of the second segment of the video program via the network link, where the second video chunk is encoded at the first bitrate of the plurality of available bitrates in accordance with the mapping function. For instance, the increase of the buffer occupancy threshold when the bandwidth is stable may result in the selection of a chunk/variant at a same encoding bitrate for a next segment. In one example, the first bitrate for the second segment is selected based upon the occupancy level of the video buffer of the device in accordance with the mapping function. In one example, the operations of optional step 660 may comprise the same or substantially similar operations as step 620 described above.

At optional step 670, the processing system may determine the bandwidth of the network link from the first bitrate, a length of the second segment, and an elapsed time to receive the second video chunk via the network link. In one example, the operations of optional step 670 may comprise the same or substantially similar operations as step 630 described above.

At optional step 680, the processing system may determine that the bandwidth of the network link remains between the two of the plurality of available bitrates. In one example, the operations of optional step 680 may comprise the same or substantially similar operations as step 640 described above.

At optional step 690, the processing system may increase the buffer occupancy threshold of the mapping function for switching to the higher one of the two of the plurality of available bitrates when it is determined that the bandwidth of the network link remains between the two of the plurality of available bitrates. In one example, the operations of optional step 690 may comprise the same or substantially similar operations as step 650 described above.

Following step 650, or one of optional steps 660-690, the method 600 proceeds to step 695 where the method ends. It should be noted that the method 600 may continue through additional cycles of downloading chunks/variants for subsequent segments. For instance, steps 620-650 may comprise a first iteration while optional steps 660-690 described operations in connection with a second iteration.

FIG. 7 illustrates a flowchart of a method 700 for filling an adaptive bitrate streaming video buffer for live video streaming, in accordance with the present disclosure. In one example, the method 700 is performed by a client device comprising a video client, e.g., STB/DVR 162A, STB/DVR 162B, one of the TVs 163A and 163B, PC 166, one of the mobile devices 157A, 157B, 167A, or 167B, and so forth, or any one more components thereof, such as a processing system, or by one of these devices in conjunction with other devices and/or components of network 100 of FIG. 1. In one example, the steps, functions, or operations of method 700 may be performed by a computing device or system 900, and/or a processing system 902 as described in connection with FIG. 9 below. For instance, the computing device 900 may represent any one or more components of a client device that is/are configured to perform the steps, functions and/or operations of the method 700. For illustrative purposes, the method 700 is described in greater detail below in connection with an example performed by a processing system, such as processing system 902. The method 700 begins in step 705 and proceeds to step 710.

At step 710, the processing system requests, from an edge server, a first video chunk for a first segment of a video program and a second video chunk for a second segment of the video program, where the first video chunk and the second video chunk are stored in a cache of the edge server. In one example, the first video chunk and the second video chunk that are requested are encoded at a testing bitrate comprising a second lowest available bitrate of a plurality of available bitrates in accordance with an adaptive bitrate streaming protocol.

At step 720, the processing system receives the first video chunk and the second video chunk from the edge server via a network link. It should be noted that the method 700 may be for live video streaming. However, the first video chunk and the second video chunk may be associated with a segment for a past time period. For instance, if the edge server has a 1 minute cache, the first video chunk and the second video chunk may be for segments that are from 1 minute in the past and from 1 minute-1 segment duration in the past, from 30 seconds in the past and 30 seconds-1 segment duration in the past, etc. In one example, the first video chunk and the second video chunk are for segments having adjacent/contiguous time slots in the past. In another example, the first video chunk and the second video chunk are for segments having non-adjacent/non-contiguous time slots in the past.

At step 730, the processing system determines a bandwidth of the network link based upon the testing bitrate, a duration of the first video chunk, a duration of the second video chunk, and an elapsed time to receive the first video chunk and the second video chunk. For instance, step 730 may comprise estimating the bandwidth in accordance with Equation 6 above.

At step 740, the processing system requests a third video chunk for a third segment of the video program encoded at a highest available bitrate below the bandwidth of the network link. It should be noted that the third video chunk may be for live video e.g., a segment for the current or present time period.

At optional step 750, the processing system may receive the third video chunk from the edge server. The edge server may already possess the third video chunk and/or may receive the third video chunk from an ingest server or one or more middle tier servers.

At optional step 760, the processing system may write the third video chunk to a video buffer of the device. The video buffer may comprise a portion of a memory that is integrated or attached to a device of the processing system and that is reserved or available for writing in and reading out video chunks.

At optional step 770, the processing system may play out the third video chunk from the video buffer via the device when an occupancy level of the video buffer exceeds a threshold. The threshold may comprise, for example, 6 seconds filled, 8 seconds filled, 10 seconds filled, 12 seconds filled, etc.

At optional step 780, the processing system may select a next video chunk for a segment of the video program after the third segment in accordance with a mapping function. In other words, after a startup process, the processing system may select subsequent segments according to the process 300 above, the process 300 in combination with a timeout function of the process 400 and/or of the method 500, the process 300 in combination with a buffer offset function of the method 600, and so on.

Following step 740, or one of optional steps 750-780, the method 700 proceeds to step 795 where the method ends.

FIG. 8 illustrates a flowchart of a method 800 for filling an adaptive bitrate streaming video buffer for recorded video streaming (e.g., VoD), in accordance with the present disclosure. In one example, the method 700 is performed by a client device comprising a video client, e.g., STB/DVR 162A, STB/DVR 162B, one of the TVs 163A and 163B, PC 166, one of the mobile devices 157A, 157B, 167A, or 167B, and so forth, or any one more components thereof, such as a processing system, or by one of these devices in conjunction with other devices and/or components of network 100 of FIG. 1. In one example, the steps, functions, or operations of method 800 may be performed by a computing device or system 900, and/or a processing system 902 as described in connection with FIG. 9 below. For instance, the computing device 900 may represent any one or more components of a client device that is/are configured to perform the steps, functions and/or operations of the method 800. For illustrative purposes, the method 800 is described in greater detail below in connection with an example performed by a processing system, such as processing system 902. The method 800 begins in step 805 and proceeds to step 810.

At step 810, the processing system requests, from an edge server, a plurality of video chunks for a plurality of segments of a video program to fill a video buffer of the device. In one example, the plurality of video chunks are encoded at a startup bitrate comprising a second lowest available bitrate of a plurality of available bitrates in accordance with an adaptive bitrate streaming protocol.

At step 820, the processing system receives, from the edge server, the plurality of video chunks. In one example, the durations of the first few segments (and hence the video chunks for the first few segments) are made shorter than for the remainder of the video program to enable faster startup playback.

At step 830, the processing system writes the plurality of video chunks to the video buffer. The video buffer may comprise a portion of a memory that is integrated or attached to a device of the processing system and that is reserved or available for writing in and reading out video chunks.

At step 840, the processing system plays out the plurality of video chunks from the video buffer via the device when an occupancy level of the video buffer exceeds a threshold. The threshold may comprise, for example, 6 seconds filled, 8 seconds filled, 10 seconds filled, 12 seconds filled, etc.

At step 850, the processing system selects a next video chunk for a segment of the video program after the plurality of segments in accordance with a mapping function. In other words, after a startup process, the processing system may select subsequent segments according to the process 300 above, the process 300 in combination with a timeout function of the process 400 and/or of the method 500, the process 300 in combination with a buffer offset function of the method 600, and so on.

Following step 850, the method 800 proceeds to step 895 where the method ends.

In addition, although not expressly specified above, one or more steps of the method 500, method 600, method 700, or method 800 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIGS. 5-8 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

Figure 9:
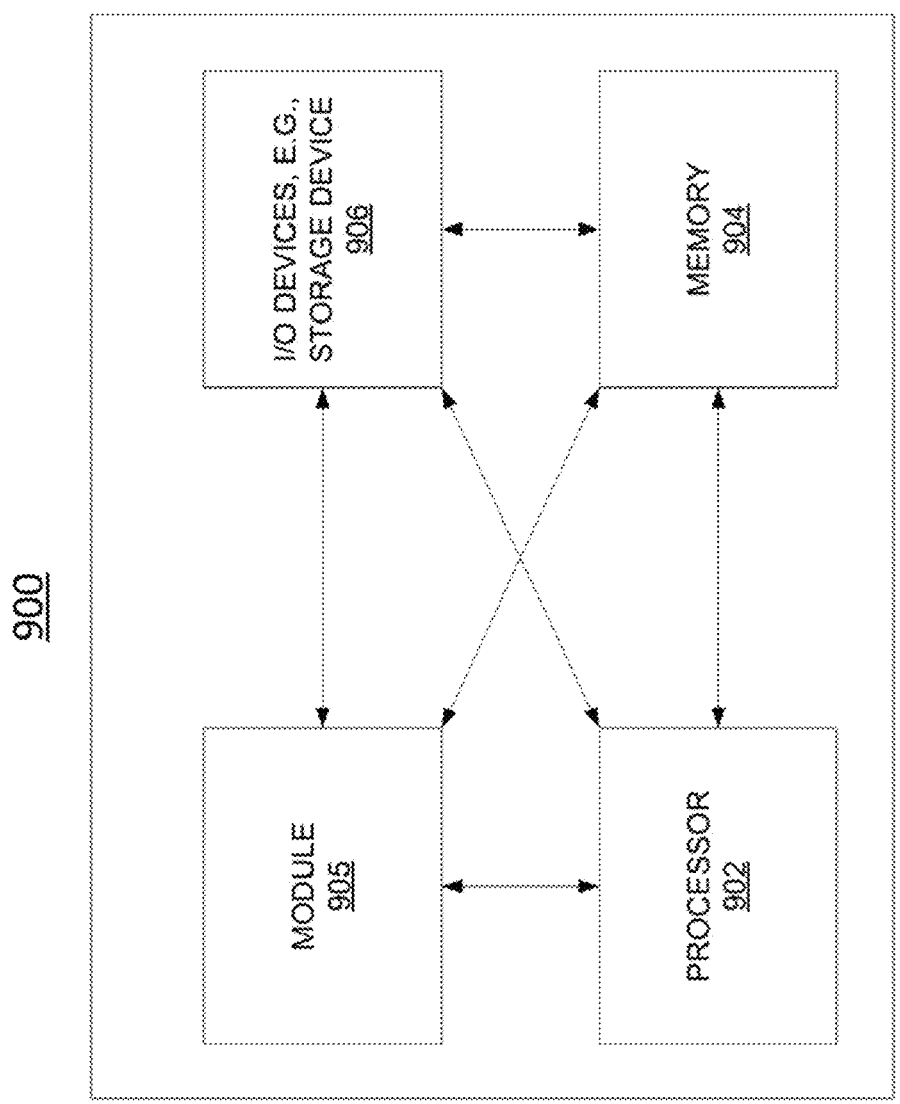
FIG. 9 illustrates a high level block diagram of a computing device specifically programmed to perform the steps, functions, blocks and/or operations described herein.

FIG. 9 depicts a high-level block diagram of a computing device or processing system specifically programmed to perform the functions described herein. For example, any one or more components or devices illustrated in FIG. 1 or described in connection with the method 500, method 600, method 700, or method 800 may be implemented as the system 900. As depicted in FIG. 9, the processing system 900 comprises one or more hardware processor elements 902 (e.g., a central processing unit (CPU), a microprocessor, or a multi-core processor), a memory 904 (e.g., random access memory (RAM) and/or read only memory (ROM)), a module 905 for providing a timeout for an adaptive bitrate streaming video chunk download, increasing a buffer occupancy threshold of an adaptive bitrate streaming mapping function, and/or for filling an adaptive bitrate streaming video buffer for live or recorded video streaming, and various input/output devices 906 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 906 may also include antenna elements, transceivers, power units, and so forth. Although only one processor element is shown, it should be noted that the computing device may employ a plurality of processor elements. Furthermore, although only one computing device is shown in the figure, if the method 500, method 600, method 700, or method 800 as discussed above is implemented in a distributed or parallel manner for a particular illustrative example, i.e., the steps of the above method 500, method 600, method 700, or method 800, or the entire method 500, method 600, method 700, or method 800 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 902 can also be configured or programmed to cause other devices to perform one or more operations as discussed above. In other words, the hardware processor 902 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 500, method 600, method 700, and/or method 800. In one example, instructions and data for the present module or process 905 for providing a timeout for an adaptive bitrate streaming video chunk download, increasing a buffer occupancy threshold of an adaptive bitrate streaming mapping function, and/or for filling an adaptive bitrate streaming video buffer for live or recorded video streaming (e.g., a software program comprising computer-executable instructions) can be loaded into memory 904 and executed by hardware processor element 902 to implement the steps, functions, or operations as discussed above in connection with the illustrative method 500, method 600, method 700, and/or method 800. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 905 for providing a timeout for an adaptive bitrate streaming video chunk download, increasing a buffer occupancy threshold of an adaptive bitrate streaming mapping function, and/or for filling an adaptive bitrate streaming video buffer for live or recorded video streaming (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A device comprising:
a processing system including at least one processor; and
a computer-readable medium storing instructions which, when executed by the processing system, cause the processing system to perform operations, the operations comprising:
determining a first bitrate for a first segment of a video program based upon an occupancy level of a video buffer of the device;
requesting, from a server, a first video chunk of the first segment encoded at the first bitrate;
determining that the first video chunk is not received from the server within a threshold of a duration of time after the requesting of the first video chunk; and
requesting, responsive to the determining that the first video chunk is not received within the threshold of the duration of time, a second video chunk of the first segment encoded at a second bitrate that is lower than the first bitrate.

2. The device of claim 1, wherein the first bitrate is determined in accordance with a mapping function of buffer occupancy levels to a plurality of available bitrates.

3. The device of claim 1, wherein the second bitrate is at least two available bitrates lower than the first bitrate.

4. The device of claim 1, wherein the threshold is based upon a segment duration of the first segment and the occupancy level.

5. The device of claim 1, wherein the operations further comprise:
receiving a manifest file for the video program, wherein the manifest file identifies a plurality of video chunks associated with a plurality of segments of the video program in accordance with an adaptive bitrate streaming protocol, the plurality of video chunks including the first video chunk and the second video chunk.

6. The device of claim 5, wherein for each of the plurality of segments, the associated plurality of video chunks includes video chunks encoded at a plurality of different available bitrates.

7. The device of claim 5, wherein a uniform resource locator for the first video chunk and a uniform resource locator for the second video chunk are identified in the manifest file, wherein the uniform resource locator for the first video chunk and the uniform resource locator for the second video chunk are both associated with an edge server, wherein the server comprises the edge server.

8. The device of claim 7, wherein the edge server comprises an edge server of a content distribution network.

9. The device of claim 7, wherein the first video chunk is requested from the edge server in accordance with the manifest file, and wherein the second video chunk is requested from the edge server in accordance with the manifest file.

10. The device of claim 1, wherein the operations further comprise:
receiving the second video chunk;
writing the second video chunk to the video buffer; and
playing out the second video chunk from the video buffer via the device.

11. A method comprising:
determining, by a processing system including at least one processor, a first bitrate for a first segment of a video program based upon an occupancy level of a video buffer;
requesting, by the processing system from a server, a first video chunk of the first segment encoded at the first bitrate;
determining, by the processing system, that the first video chunk is not received from the server within a threshold of a duration of time after the requesting of the first video chunk; and
requesting, by the processing system, responsive to the determining that the first video chunk is not received within the threshold of the duration of time, a second video chunk of the first segment encoded at a second bitrate that is lower than the first bitrate.

12. The method of claim 11, wherein the first bitrate is determined in accordance with a mapping function of buffer occupancy levels to a plurality of available bitrates.

13. The method of claim 11, wherein the second bitrate is at least two available bitrates lower than the first bitrate.

14. The method of claim 11, further comprising:
receiving a manifest file for the video program, wherein the manifest file identifies a plurality of video chunks associated with a plurality of segments of the video program in accordance with an adaptive bitrate streaming protocol, the plurality of video chunks including the first video chunk and the second video chunk.

15. The method of claim 14, wherein for each of the plurality of segments, the associated plurality of video chunks includes video chunks encoded at a plurality of different available bitrates.

16. The method of claim 14, wherein a uniform resource locator for the first video chunk and a uniform resource locator for the second video chunk are identified in the manifest file, wherein the uniform resource locator for the first video chunk and the uniform resource locator for the second video chunk are both associated with an edge server, wherein the server comprises the edge server.

17. The method of claim 16, wherein the edge server comprises an edge server of a content distribution network.

18. The method of claim 16, wherein the first video chunk is requested from the edge server in accordance with the manifest file, and wherein the second video chunk is requested from the edge server in accordance with the manifest file.

19. The method of claim 11, further comprising:
receiving the second video chunk;
writing the second video chunk to the video buffer; and
playing out the second video chunk from the video buffer via a device.

20. A non-transitory computer-readable medium storing instructions which, when executed by a processing system including at least one processor, cause the processing system to perform operations, the operations comprising:
determining a first bitrate for a first segment of a video program based upon an occupancy level of a video buffer;
requesting, from a server, a first video chunk of the first segment encoded at the first bitrate;
determining that the first video chunk is not received from the server within a threshold of a duration of time after the requesting of the first video chunk; and
requesting, responsive to the determining that the first video chunk is not received within the threshold of the duration of time, a second video chunk of the first segment encoded at a second bitrate that is lower than the first bitrate.

* * * * *